(12) United States Patent
Ljungdahl

(10) Patent No.: US 9,505,384 B2
(45) Date of Patent: Nov. 29, 2016

(54) DEVICE AND METHOD FOR REMOVING RUST ON MOTOR VEHICLE WHEEL BRAKES

(75) Inventor: Peter Ljungdahl, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 1150 days.

(21) Appl. No.: 13/520,318

(22) PCT Filed: Nov. 12, 2010

(86) PCT No.: PCT/EP2010/067387
§ 371 (c)(1),
(2), (4) Date: Sep. 28, 2012

(87) PCT Pub. No.: WO2011/085841
PCT Pub. Date: Jul. 21, 2011

(65) Prior Publication Data
US 2013/0023382 A1    Jan. 24, 2013

(30) Foreign Application Priority Data
Jan. 12, 2010  (DE) .......................... 10 2010 000 823

(51) Int. Cl.
*F16D 65/00* (2006.01)
*B60T 7/12* (2006.01)
*B60T 17/22* (2006.01)

(52) U.S. Cl.
CPC ................ *B60T 7/12* (2013.01); *B60T 17/221* (2013.01); *F16D 65/0037* (2013.01); *Y10T 477/814* (2015.01)

(58) Field of Classification Search
None
See application file for complete search history.

(56) References Cited

U.S. PATENT DOCUMENTS

2005/0124462 A1    6/2005  Wagner et al.

FOREIGN PATENT DOCUMENTS

| CN | 1457407 | 11/2003 |
| CN | 2876904 | 3/2007 |
| DE | 199 16 700 | 10/2000 |
| DE | 103 38 564 | 3/2005 |
| JP | 2006 123619 | 5/2006 |
| JP | 2008 132906 | 6/2008 |
| WO | WO2005021345 | * 3/2005 |

OTHER PUBLICATIONS

International Search Report for PCT/EP2010/067387, dated May 6, 2011.

* cited by examiner

*Primary Examiner* — Erin D Bishop
(74) *Attorney, Agent, or Firm* — Norton Rose Fulbright US LLP; Gerard Messina

(57) ABSTRACT

A device for removing rust on a brake disk of a wheel brake includes a control unit which automatically activates a brake actuator in order to apply brake shoes to the brake disk of the brake if at least one vehicle parameter satisfies a predefined activation condition.

10 Claims, 1 Drawing Sheet

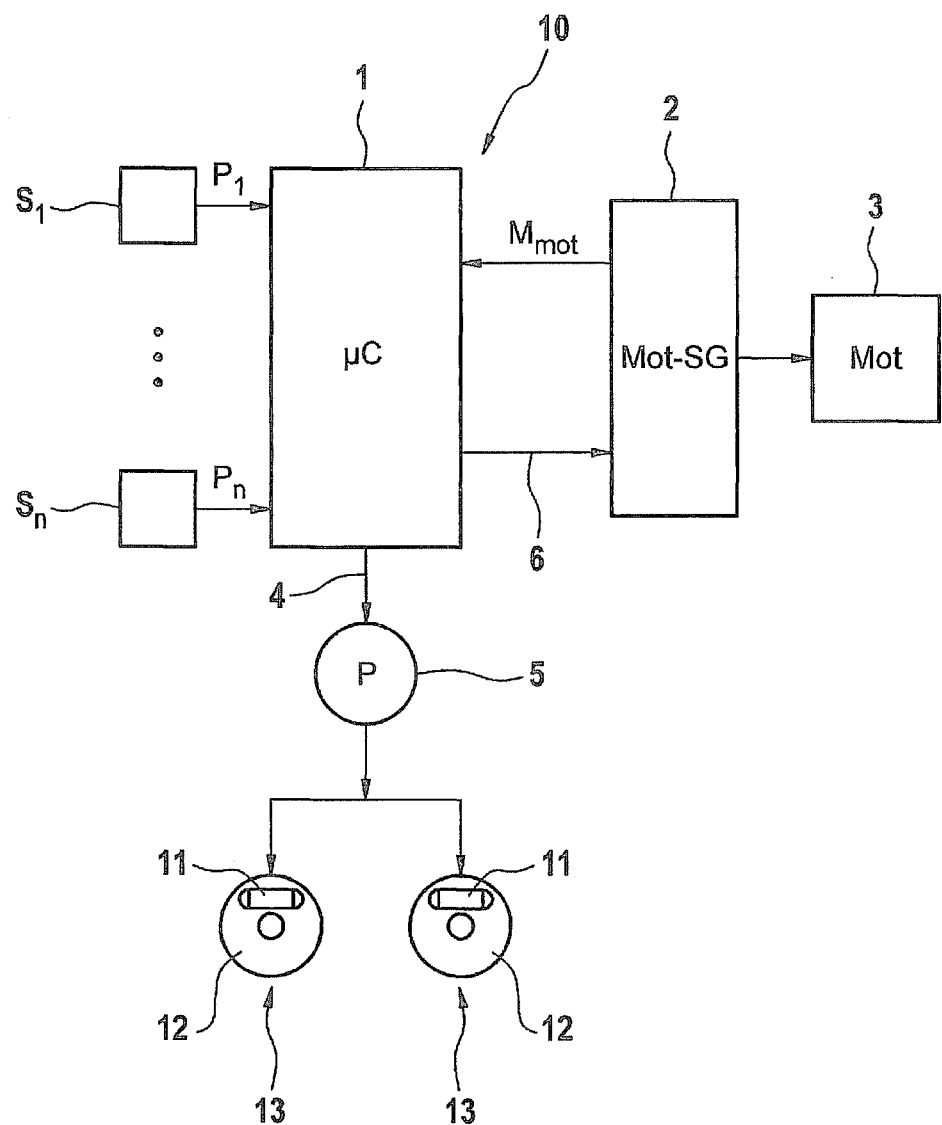

DEVICE AND METHOD FOR REMOVING RUST ON MOTOR VEHICLE WHEEL BRAKES

BACKGROUND OF THE INVENTION

1. Field of the Invention

The present invention relates to a device for removing rust on motor vehicle wheel brakes.

2. Description of the Related Art

In most cases, electric and hybrid vehicles are braked by a generator in order to be able to recover energy from the braking operation. On the other hand, the wheel brakes of a hydraulic brake system are used rather rarely. This may cause rust to be deposited on the brake disks of the wheel brakes, which reduces the braking power.

To improve the braking power in wet conditions, the so-called brake disk wiping is known to be carried out. In this case, the brake shoes are applied to the brake disks with light pressure, so that a water film present on the brake disk is removed. The condition "wet" is normally detected with the aid of a rain sensor. When this function is carried out, rust is also in principle removed from the brake disk. However, the brake disk wiping function for removing rust is only of limited suitability, since rust may also form on the brake disks when it does not rain for an extended time.

An object of the present invention is therefore to provide a device for removing rust on the brake disks of a vehicle.

According to the present invention, a braking device having a rust removal function is proposed which includes a control unit which automatically activates a wheel brake if at least one vehicle parameter satisfies a particular predefined activation condition. In contrast to environmental parameters, such as "wetness," for example, all parameters affecting the vehicle itself are understood to be vehicle parameters in this case. Vehicle parameters according to the present invention are, for example: the vehicle speed, the engine torque of a vehicle engine, an ignition cycle counter content, time information such as, for example, information concerning the operating time of the vehicle, or a brake pressure. If at least one of the vehicle parameters satisfies a particular predefined activation condition, the rust removal function according to the present invention is performed by applying the brake shoes to the brake disks with a light brake pressure. This simply polishes away the rust present on the brake disk. This invention is in particular advantageous for electric and hybrid vehicles, since the hydraulic wheel brakes are used less often in these vehicles.

According to one preferred specific embodiment of the present invention, the engine torque of a vehicle engine is increased during the rust removal in order to compensate at least partially for the braking effect of the rust removal. The engine torque of the vehicle engine may, for example, be adjusted by the control unit. If the braking effect of the wheel brakes is completely compensated, the rust removal operation is no longer noticeable for the driver.

According to one exemplary embodiment of the present invention, one of the vehicle parameters is an ignition cycle counter content, which may be determined, for example, with the aid of a counter. In this case the associated activation condition is, for example, satisfied if the presently ascertained counter content is greater than the one in the most recently performed rust removal. In order to avoid unnecessary stresses of the brakes and save energy, the rust removal operation should preferably be activated no oftener than once per ignition cycle. The rust removal function may be adjusted in such a way that it is carried out only once each second, third or nth ignition cycle.

One of the vehicle parameters may also be a vehicle speed, which may be measured, for example, with the aid of wheel speed sensors. In this case, the associated activation condition is, for example, satisfied if the measured vehicle speed is higher than a determined threshold value. The threshold value may amount to, for example, 50 km/hr or it may also be lower, in the case of heavy vehicles, for example, 30 km/hr. This has the advantage that starting from a certain driving speed, the rust removal is no longer audible for the driver due to wind and tire noises.

One of the vehicle parameters may also be an engine torque of a vehicle engine, which is provided, for example, by an engine control unit. In this case, the associated activation condition is satisfied, for example, if the presently ascertained engine torque is lower than a predefined threshold value such as, for example, 80% of a maximum engine torque. This activation condition is intended to ensure that sufficient power reserves are available to be able to compensate for the braking torque by increasing the engine torque.

One of the vehicle parameters may also be a brake pressure, which may be measured, for example, with the aid of a pressure sensor. In this case, the associated activation condition is satisfied, for example, if the measured brake pressure is equal to or lower than a predefined threshold value such as, for example, 0 bar. This activation condition ensures that the rust removal function is not carried out during a brake pedal operation. An operation of the service brake could optionally also be detected using a brake pedal sensor such as, for example, a displacement sensor.

Another vehicle parameter may also be time information, which may be measured, for example, with the aid of a timer. The time information may relate to, for example, the operating time or the shutdown time of the vehicle. In this case, the associated activation condition is, for example, satisfied if the measured time duration is greater than a predefined threshold value. The rust removal function may thus be carried out, for example, every 10 or 20 operating hours.

The brake pressure exerted by the rust removal function advantageously amounts to more than 5 bar and in particular more than 10 bar. The brake pressure during rust removal is preferably higher than in the case of brake disk wiping.

The duration of the rust removal is preferably individually adjustable.

BRIEF DESCRIPTION OF THE DRAWINGS

FIG. 1 shows a brake system having a rust removal device according to an exemplary embodiment of the present invention.

DETAILED DESCRIPTION OF THE INVENTION

FIG. 1 shows a schematic diagram of a hydraulic brake system having two wheel brakes 13 and a rust removal device 10 for removing rust on wheel brakes 13. Each wheel brake 13 includes a brake disk 12 and brake shoes 11 and may be operated optionally using a foot brake pedal (not shown) and/or a brake actuator 5 such as, for example, a hydraulic pump.

In the case of electric and hybrid vehicles, wheel brakes 13 are used rather rarely, since such vehicles are braked purely by a generator in most cases. For that reason, rust may be deposited on brake disks 12, which reduces the braking power.

In order to improve the braking power, the depicted brake device includes a rust removal device 10 having an algorithm stored in a control unit 1 and one or a plurality of sensors $S_1$-$S_n$, which are connected to control unit 1. The sensors measure various vehicle parameters such as, for example, the vehicle speed or a brake operating state, which will be explained in greater detail later.

Control unit 1 reads in individual sensor signals $P_1$-$P_N$ and performs a rust removal function if sensor signal or sensor signals $P_1$-$P_N$ satisfy a predefined activation condition. If the activation condition is satisfied, brake actuator 5 is activated by control unit 1 via a control line 4 and automatically builds up a predefined brake pressure on wheel brakes 13, so that brake shoes 11 are applied to brake disks 12 and they simply abrade away the rust. The brake pressure is maintained for a predefined period of time. Optionally, fewer or more sensors $S_1$-$S_n$ may also be provided, and accordingly fewer or more vehicle parameters may be monitored.

Sensor signals $P_1$-$P_N$ read in from control unit 1 are, for example, an ignition cycle counter content, a brake pressure such as, for example, the pre-pressure stipulated by the driver, an engine torque, an accelerator pedal position, a wheel speed or vehicle speed, or a brake operating state which reveals whether the brake pedal is operated or not. Corresponding sensors $S_1$-$S_n$ are in this case an ignition cycle counter, a brake pressure sensor, an accelerator pedal position sensor, wheel speed sensors and a brake pedal sensor such as, for example, a pedal position sensor. The engine torque may be read in, for example, from an engine control unit 2.

In the present example, a rust removal function is performed if the ignition cycle counter content is greater than the one in the most recently carried out rust removal, the vehicle speed exceeds a predefined threshold value of, for example, 30 km/hr or also 50 km/hr, the engine torque of the vehicle drive is lower than a predefined threshold value such as, for example, 80% of the maximum engine torque, and the vehicle is not momentarily being braked.

In the present exemplary embodiment, the rust removal function is activated if all forenamed activation conditions are satisfied. Depending on the requirement, however, more or fewer activation conditions may also be defined.

The consequence of the automatic operation of brake shoes 11 for rust removal is that the vehicle is decelerated slightly. In order to compensate for this deceleration, it is provided here to increase accordingly the engine torque of a vehicle engine 3. To that end, control unit 1 generates a corresponding control signal which is sent to engine control unit 2 via a control line 6. The engine control unit then increases the engine torque of the vehicle engine such as, for example, an electric motor. As a result, the driver no longer notices a deceleration.

Using the rust removal device according to the present invention, the rust is removed from brake disks 12 in regular intervals. As a result, it is possible to ensure a constantly good braking power of wheel brakes 13.

What is claimed is:

1. A device for removing rust from a brake disk of a wheel brake, comprising:
    a control unit configured to automatically activate a brake actuator in order to apply brake shoes to the brake disk of the wheel brake if a first vehicle parameter satisfies a first predefined activation condition, wherein the first vehicle parameter includes an ignition cycle counter content, and the first predefined activation condition is satisfied if an ascertained ignition cycle counter content is greater than a predefined value.

2. The device as recited in claim 1, wherein the control unit also activates, if the first predefined activation condition is satisfied, a vehicle engine in order to at least partially compensate for a braking action of the wheel brake during rust removal.

3. The device as recited in claim 2, wherein a second vehicle parameter includes a vehicle speed, and a second predefined activation condition is satisfied if the vehicle speed is higher than a predetermined threshold value.

4. The device as recited in claim 2, wherein a second vehicle parameter includes an engine torque of the vehicle engine, and a second predefined activation condition is satisfied if an ascertained engine torque is lower than a predefined threshold value.

5. The device as recited in claim 2, wherein a second vehicle parameter includes a brake pressure, and a second predefined activation condition is satisfied if a measured brake pressure is equal to or lower than a predetermined threshold value.

6. A method for removing rust from a brake disk of a wheel brake of a vehicle, comprising:
    automatically activating the wheel brake if a first ascertained vehicle parameter satisfies a first predefined activation condition for activating the wheel brake in order to remove rust from the brake disk, wherein the first vehicle parameter is an ignition cycle counter content, and the first predefined activation condition is satisfied if an ascertained ignition cycle counter content is greater than a predefined value.

7. The method as recited in claim 6, further comprising:
    increasing an engine torque of a vehicle engine with the aid of a control unit in order to at least partially compensate for a braking effect of the wheel brake during rust removal.

8. The method as recited in claim 7, wherein a second vehicle parameter is a vehicle speed, and a second predefined activation condition is satisfied if a measured vehicle speed is higher than a predetermined threshold value.

9. The method as recited in claim 7, wherein a second vehicle parameter is the engine torque of the vehicle engine, and a second predefined activation condition is satisfied if an ascertained engine torque is lower than a predetermined threshold value.

10. The method as recited in claim 7, wherein a second vehicle parameter is a measured brake pressure, and a second predefined activation condition is satisfied if the measured brake pressure is equal to or lower than a predetermined threshold value.

* * * * *